United States Patent
Ehlers et al.

(10) Patent No.: US 8,944,380 B2
(45) Date of Patent: Feb. 3, 2015

(54) MOVABLE FASTENING UNIT FOR A SEAT FRAME IN AN AIRCRAFT

(75) Inventors: Bernd Ehlers, Hamburg (DE); Mark Herzog, Barsbüttel (DE); Stephan Schmock, Bargteheide (DE)

(73) Assignee: Airbus Operations GmbH (DE)

( * ) Notice: Subject to any disclaimer, the term of this patent is extended or adjusted under 35 U.S.C. 154(b) by 632 days.

(21) Appl. No.: 12/864,945

(22) PCT Filed: Jan. 15, 2009

(86) PCT No.: PCT/EP2009/050437
§ 371 (c)(1),
(2), (4) Date: Sep. 27, 2010

(87) PCT Pub. No.: WO2009/095309
PCT Pub. Date: Aug. 6, 2009

(65) Prior Publication Data
US 2011/0042514 A1 Feb. 24, 2011

Related U.S. Application Data

(60) Provisional application No. 61/062,970, filed on Jan. 30, 2008.

(30) Foreign Application Priority Data
Jan. 30, 2008 (DE) .......... 10 2008 006 695

(51) Int. Cl.
B64D 11/06 (2006.01)
B64D 25/00 (2006.01)
B60R 21/207 (2006.01)
B60N 2/68 (2006.01)

(52) U.S. Cl.
CPC .......... *B64D 11/0696* (2013.01); *B60R 21/207* (2013.01); *B64D 11/06* (2013.01); *B60N 2/68* (2013.01); *B64D 2011/0644* (2013.01)
USPC .................................................. 244/122 R

(58) Field of Classification Search
USPC ......... 244/122 R, 118.6, 122 AH; 297/445.1, 297/344.16, 329, 338, 216.13
See application file for complete search history.

(56) References Cited

U.S. PATENT DOCUMENTS 3,006,594 A * 10/1961 Gruendler ..................... 248/424
5,782,533 A * 7/1998 Fischer et al. ................ 297/338
7,140,682 B2 * 11/2006 Jaeger et al. .................. 297/330

(Continued)

FOREIGN PATENT DOCUMENTS

DE 335103 C 3/1921
DE 200 15 115 U1 1/2002

(Continued)

*Primary Examiner* — Valentina Xavier
(74) *Attorney, Agent, or Firm* — Lerner, David, Littenberg, Krumholz & Mentlik, LLP

(57) ABSTRACT

The invention relates to a movable fastening unit for a seat frame in an aircraft. In said fastening unit, a connecting element can be movably mounted on both a seat structure and a floor fixture by means of bearings, thus allowing the seat frame to be moved relative to the floor fixture without having to detach the fixture from the floor.

14 Claims, 4 Drawing Sheets

(56) References Cited

U.S. PATENT DOCUMENTS

| | | | |
|---|---|---|---|
| 7,140,684 B2 * | 11/2006 | Wagner et al. | 297/344.16 |
| 7,393,055 B2 | 7/2008 | Abt | |
| 7,712,836 B2 * | 5/2010 | Deml | 297/344.16 |
| 8,087,729 B2 * | 1/2012 | Kladde | 297/445.1 |
| 2001/0038233 A1 * | 11/2001 | Eklind | 297/216.13 |
| 2004/0046430 A1 | 3/2004 | Plant et al. | |
| 2004/0066073 A1 | 4/2004 | Wagner et al. | |
| 2012/0085863 A1 * | 4/2012 | Kladde | 244/122 R |

FOREIGN PATENT DOCUMENTS

| | | |
|---|---|---|
| DE | 10 2004 019 299 A1 | 12/2005 |
| DE | 102004058204 A1 | 6/2006 |
| DE | 202007004439 U1 | 6/2007 |
| FR | 800118 A | 6/1936 |
| FR | 813359 A | 5/1937 |
| FR | 2805500 A1 | 8/2001 |
| WO | 02066284 A1 | 8/2002 |

* cited by examiner

MOVABLE FASTENING UNIT FOR A SEAT FRAME IN AN AIRCRAFT

CROSS-REFERENCE TO RELATED APPLICATIONS

This application is a national phase entry under 35 U.S.C. §371 International Application No. PCT/EP2009/050437, filed Jan. 15, 2009, published in German, which claims the benefit of the filing date of German Patent Application No. 10 2008 006 695.8 filed on 30 Jan. 2008 and of U.S. Provisional Patent Application No. 61/062,970 filed on 30 Jan. 2008, the entire disclosures of which applications are hereby incorporated herein by reference.

TECHNICAL FIELD

The invention relates to seating in aircraft. In particular, the invention relates to a movable fixing unit for a seat frame in an aircraft, to a seat unit for an aircraft seat comprising such a fixing unit, to the use of such a fixing unit, to an aircraft comprising such a fixing unit, and to a method for varying the seat pitch by means of such a fixing unit.

BACKGROUND TO THE INVENTION

Known fixing arrangements for seats in aircraft are always bound to the fixed installation on the seat rail. Furthermore, due to the rigid seat frame it is not possible to adjust the seats in longitudinal direction of the aircraft (hereinafter referred to as the x-direction) without undoing this installation. This can, for example for reasons connected with the expenditure and the time used for seat reconfiguration, result in a situation in which business class (BC) passengers have the same seat pitch as economy class (EC) passengers. On long-distance flights there is, as a rule, a large difference in the seat comfort between BC and EC. However, for short feeder flight routes the airlines also use aircraft of smaller fuselage diameter, so-called single-aisle (SA) aircraft.

Many aircraft of the SA family provide variable BC. In this arrangement a curtain affixed to a rail is slid in longitudinal direction of the aircraft and in this manner serves as a class divider. The curtain divides BC in the front part of the cabin from EC in the rear part of the cabin. Typically in BC the middle seat of an arrangement of three seats remains free, and catering is provided at a higher level than in EC. However, the seat comfort, in particular the distance to the front seat, is quasi identical to that in EC.

While in these SA aircraft the difference between BC and EC is, for example, very small, business class customers are, however, confronted with a large difference in comfort between these so-called feeder flights and the actual flight in the long-distance aircraft within the same airline. The requirement for variable class division that can be carried out directly at the gate, for example by cabin personnel, has become greater, among other things because of the aforementioned.

PRESENTATION OF THE INVENTION

It may be considered to be an object of the invention to state a device for quick and flexible reconfiguration of an aircraft seat arrangement.

Stated are a movable fixing unit, a seat unit, the use of a movable fixing unit in an aircraft, an aircraft comprising a movable fixing unit, and a method for varying the seat pitch by means of a movable fixing unit according to the characteristics of the independent claims. Advantageous embodiments of the invention are stated in the subordinate claims.

The described exemplary embodiments relate equally to the movable fixing unit, to the seat unit, to their use in an aircraft, to an aircraft comprising a fixing unit, and to the method. According to an exemplary embodiment of the invention, a movable fixing unit for a seat frame in an aircraft is stated, wherein the fixing unit comprises a connecting element, wherein the connecting element comprises a first bearing arrangement by means of which it can be movably attached to the seat frame. In this arrangement the connecting element comprises a second bearing arrangement by means of which it can be movably affixed to a floor affixation device. Furthermore, both bearing arrangements interact in such a manner that movement of the seat frame relative to the floor affixation device becomes possible.

In this arrangement the connecting element can, for example, be a brace that can be held by one of its two ends on the seat frame or on part of the floor structure or on affixation elements of the floor structure. In this arrangement any bearings within the field of technical mechanics are possible. Instead of the brace, any other mechanical element can be used as a connecting element provided it is designed such in shape and material that it can lead, into the floor structure, at least the gravitational force of the seat and of the passenger seated thereon without any problems, in other words without incurring any wear and fatigue.

Ideally, the movable fixing unit is also in a position to transfer, and if applicable absorb, loads that occur in a crash.

In this arrangement the movable fixing unit according to this exemplary embodiment of the invention provides for such a quick and technically non-complicated option, which is associated with little installation effort, of changing the seating in the aircraft so that the crew can spontaneously change the seat pitch. In this way it is possible, for example, to variably react directly at the gate to the number of passengers.

In this arrangement the seats in question comprise a seat frame that makes possible variable positioning of the seat in several positions in any desired direction of the aircraft, without the need to undo the seat from the seat frame. This makes possible quick changing of the seat pitch while the floor affixation device (support) remains screwed onto the seat rail. Furthermore, it is possible to offer business class passengers clearly improved seating comfort when compared to that hitherto provided.

This makes it possible, for example, to reduce the costs of reconfiguration of seating in an aircraft.

Thus, as a result of movement of the fixing unit the seat frame can, for example, assume different seat pitches. In this way a greater or lesser level of comfort, space, stowage space and legroom for passengers can be provided.

In this arrangement it continues to be possible to also change the seat angle by means of an exemplary embodiment of the fixing unit and to optimise it with the purpose of enhancing the comfort of the passenger seated in the particular seat, and/or of the passengers seated in seats around said seat.

This and any other exemplary embodiment of the invention make it possible to move the seat frame by means of the movable fixing unit in all three spatial directions, unless otherwise determined. In the direction of the length of the aircraft (x-direction) the technical effect of the invention can be used in order to optimise the seat pitch, i.e. the spacing of seats arranged one behind the other. Likewise it may be desirable to be able to increase or decrease the lateral seat spacing in a simple and flexible manner. This would require a change in position along the transverse axis of the aircraft (y-direction). However, height adjustment of the seat in the direction pointing perpendicular to the aircraft floor (z-direction) is also possible according to an exemplary embodiment of the invention.

In other words, fast and non-complicated adjustment of a seat frame or of a seat is possible without the need to undo the fixing arrangement on the seat rail. In this arrangement fast reconfiguration of the seat pitch is possible in order to be able to react to different load factors in the various classes of the aircraft and to different overall passenger numbers.

Furthermore, it is possible to combine this exemplary embodiment of the invention with a joint that makes it possible for the aircraft seat to rotate on its own vertical axis. This combination can, for example, make it possible for a seat that was originally aligned in longitudinal direction of the aircraft (x-direction) to be rotated, for example by 90°. Starting from this position, by means of operation of the fixing unit, the distance between the seat and the window side of the aircraft or its neighbouring seats is variably adjustable.

Furthermore, movement of the seat frame by means of the movable fixing unit is made possible without undoing the floor affixation device from the floor.

According to a further exemplary embodiment of the invention, movement of the seat frame relative to the floor affixation device takes place from a first seat position to a second seat position, wherein both seat positions are stable seat positions from which the seat frame can only be moved with the application of external force.

This thus requires only simple mechanical securing of the fixing unit in one of the two positions.

It is possible to use materials that comprise a high ratio of mechanical rigidity to specific weight. Apart from conventional metals, it is, for example, possible to use aluminium, titanium, honeycomb materials, fibre composite materials or carbon for this.

According to a further exemplary embodiment of the present invention, movement of the seat frame takes place without undoing the floor affixation device from the floor.

In this manner a situation can be prevented in which, as a result of undoing and unlocking the floor affixation device and, for example, subsequent sliding of the seat on the seat rail or even by complete removal of the seat, the position of the complete seat unit can only be effected with significant expenditure of tools and force. This makes it possible for the usual cabin crew to itself carry out any reconfiguration. In this arrangement it is possible to save installation costs and to increase flexibility.

According to a further exemplary embodiment of the present invention, at least one bearing arrangement of the fixing unit is designed so as to be rotationally held.

As shown, for example, in FIGS. 1 to 3, such a rotational bearing arrangement makes possible simple frictionless movement of the seats in the desired direction without this requiring any great expenditure of force.

In this arrangement other bearing arrangements and devices are possible, such as joints that make it possible to vary the coordinates of the seat frame by means of the fixing unit. Thus, apart from a rotationally held variant, it is, for example, possible to use a ball joint, hinge joint, ellipsoid joint, saddle joint, pivot joint or a planar joint as a bearing arrangement on the floor affixation device and/or as a bearing arrangement on the seat frame.

According to a further exemplary embodiment of the present invention, the fixing unit comprises a locking mechanism in the region of one of the bearing arrangements, wherein the mechanism comprises an unlocked and a locked state, and wherein the unlocked state makes it possible for the connecting element to move on the respective bearing arrangement. Furthermore, the locked state prevents movement of the connecting element on the respective bearing arrangement.

In this arrangement the fixing unit can also comprise several mechanisms for locking, wherein it is not mandatory for the mechanisms to interact with each other.

Due to this mechanism of the fixing unit according to this exemplary embodiment of the invention the seat frame can thus be moved to a stable position from which the seat frame can no longer be moved as a result of the action of usual forces. In this arrangement the mechanism can be designed so as to be simple and Spartan in order to bring about quick and flexible change in the seat position of the seat frame. This can, for example, be carried out by the cabin crew at the gate.

In this arrangement the mechanism can be of a purely mechanical nature. However, electrical locking of a mechanism, or locking by means of magnetic forces, or any combination of these variants is possible with the aforesaid.

In the case of aircraft-related applications, furthermore, a closure element can be provided which prevents unauthorised unlocking of the locking mechanism by unauthorised persons, for example by passengers. The mechanism can, for example, be made inaccessible to unauthorised persons by means of the closure element. It is thus possible to lock the mechanism.

According to a further exemplary embodiment of the present invention, at least one of the two elements of the seat frame and the floor affixation device, in conjunction with the connecting element, comprises the locking mechanism.

This is, for example, clearly shown in FIG. 2, wherein in the illustration the locking mechanism is implemented by means of a hole 8 and a pin (not shown in the diagram) for locking. FIG. 2 shows the variant in which the locking mechanism is shown on the element of the seat frame 7 and the connecting element 5. In this arrangement the two holes 8 correspond to the seat positions of the seat, which seat positions are, for example, different from each other.

However, it is also possible to use a latch closure with a latch, for example a detent pawl or a latch. In this arrangement the latch is a component that represents a single-arm, more rarely a dual-arm short lever that is rotatably held on a pivot, which lever is then used to inhibit the movement of some other component, in this case the seat frame.

According to a further exemplary embodiment of the present invention, the locking mechanism comprises a bore hole in conjunction with a locking pin.

In this arrangement the hole can, for example, be present on the connecting element and on the element of the seat frame or of the seat structure, but locking at some other positions is also possible. By sliding a pin into the predrilled structure it is possible to prevent further movement of the seat frame with the fixing unit even in the case of future influence of force. Locking is thus effected, and a stable seat position is achieved.

According to a further exemplary embodiment of the present invention, the mechanism supports locking in two different positions.

This exemplary embodiment of the invention is clearly illustrated in FIG. 2 and FIG. 4. In this arrangement it is possible, for example, to connect the front seat position, or the seat position with the backrest in the forward position, in the upper part of FIG. 4 to the left-hand part of FIG. 2, in which position locking of the connecting element takes place by inserting a pin into a hole of part of the seat structure 6.

According to a further exemplary embodiment of the present invention, by means of movement on the bearing arrangement the fixing unit makes it possible to position the seat frame along a predetermined axis.

In an aircraft this can, for example, be the x-, y- or z-axis. In order to optimise and adapt the seat pitches in longitudinal direction of the aircraft, movement of this exemplary embodiment of the fixing unit can take place along the x-axis. However, lateral optimisation of the seat spacing in the y-direction is not excluded in this arrangement. Likewise, any desired height adjustment of the seat in the z-direction can thus be implemented.

According to a further exemplary embodiment of the present invention, the fixing unit is designed for infinitely adjustable positioning of the seat frame.

In contrast to the variant in which two concrete seat positions can be controlled, it is also possible to implement a design of the exemplary embodiment of the invention in which infinitely variable positioning of the seat starting from an initial position is possible in all three spatial directions x, y, and z.

In this arrangement the locking mechanism described above can equally be used with an infinitely lockable positioning unit or an infinitely lockable fixing unit and can be integrated into the aforesaid.

According to a further exemplary embodiment of the present invention, the fixation unit furthermore comprises the floor affixation device and a fixation unit, wherein the fixing unit forms part of the seat frame of the aircraft, and wherein the connecting element can be affixed to the seat frame by means of the fixation unit.

In this way a mechanical unit is described which is, for example, shown in FIG. 2 and which can be affixed as a complete unit both to the underlying floor structure and to the seat structure situated above it. It can thus be ensured that by means of the mechanical unit each element is mentioned and contained, which element for quick implementation of the seat spacing in any desired direction within an aircraft is necessary without undoing the affixation on a seat rail construction.

In this context the term "seat" refers, for example, to an economy class seat, a business class seat, a first class seat, a seat for the cockpit crew, a seat for the cabin crew, or a TTL (taxi-takeoff-landing) seat.

According to a further exemplary embodiment of the present invention, a seat unit for an aircraft seat is stated, wherein the seat unit comprises the following elements: an aircraft seat and a fixing unit according to any one of the preceding exemplary embodiments.

In this arrangement this exemplary embodiment represents a further unit that can be affixed in its entirety onto any predetermined aircraft floor structure. After affixation of this mechanical seat unit at any desired point in time with very little mechanical effort, for example by the cabin crew, the position of the seat relative to its surroundings in the aircraft can be attained by activating the movement mechanism. In this arrangement the movement mechanism is implemented by the fixing unit.

According to a further exemplary embodiment of the present invention, a seat unit is stated, wherein the aircraft seat comprises a foldable backrest and wherein by means of folding the backrest the aircraft seat can be converted to a table or to a storage unit for a passenger seated behind it.

This exemplary embodiment of the invention is, for example, shown in FIG. 3. It is thus possible to fold-over part of the backrest and to turn it into a tabletop or a multifunctional storage unit. This can further enhance the comfort of the passengers situated around it.

According to a further exemplary embodiment of the present invention, the use of a fixing unit in an aircraft is stated.

According to a further exemplary embodiment of the present invention, an aircraft comprising a fixing unit is stated.

According to a further exemplary embodiment of the present invention, a method for changing the spacing of seating in an aircraft by means of a movable fixing unit according to an exemplary embodiment of the invention is stated. In this arrangement the method comprises the following step: moving a seat without undoing the seat from an affixation device on the floor, wherein the act of moving positions the entire seat along a predetermined direction.

In this arrangement, movement of the seat is, for example in FIGS. 1, 2, 4 and 5, indicated by an arrow and can, for example, take place along the x-axis in the aircraft.

According to a further exemplary embodiment of the present invention, the act of moving changes the spacing of the seats from surrounding seats.

According to a further exemplary embodiment of the present invention, the method further comprises the steps of: unlocking a locking mechanism of the movable fixing unit and locking a locking mechanism of the movable fixing unit.

Furthermore, within the method, steps can be implemented which remove seats from the present seating, or add seats to the present seating. For example, in FIGS. 5 and 6 reconfiguration of the seats is described, which reconfiguration can be achieved and implemented by means of the method. In this arrangement increased passenger comfort can be attained.

Further exemplary embodiments and advantages of the invention are stated in the following description of the figures. However, the invention is not limited to these exemplary embodiments.

The illustrations in the figures are diagrammatic and not to scale.

DETAILED DESCRIPTION OF THE EXEMPLARY EMBODIMENTS

Figure 1:
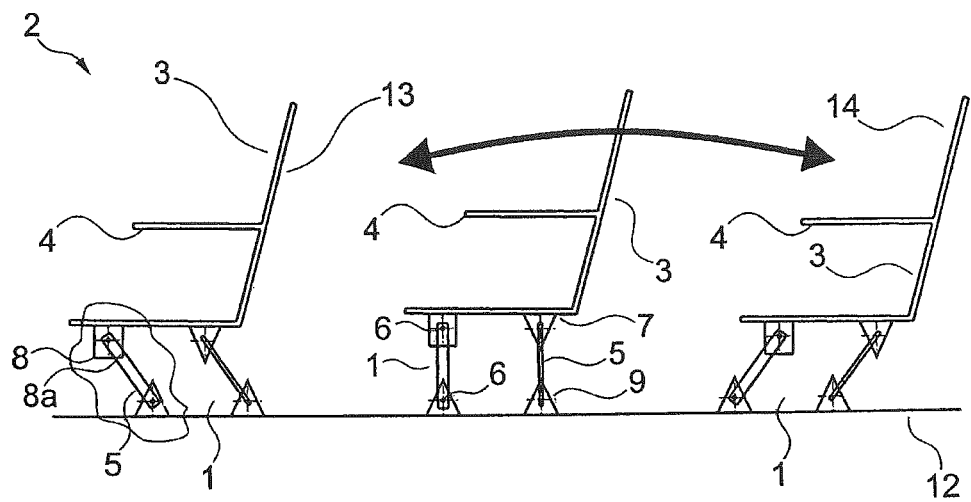
FIG. 1 shows a diagrammatic two-dimensional view of a movable fixing unit according to an exemplary embodiment of the present invention.

Below, preferred exemplary embodiments of the present invention are described with reference to the figures.

In the following description of the figures the same reference characters are used for identical or similar elements.

FIG. 1 shows a seat with a movable fixing unit 2 in three different positions. This arrangement shows a seat 3 with armrests 4, which seat is installed on the movable fixing unit 1. The diagram shows that in this exemplary embodiment of the present invention the seat 2 comprises movable fixing units which can, for example, be arranged one behind the other. The left-hand part of FIG. 1 shows a first position 13, which is forward inclined, of the seat; the middle drawing corresponds to an upright position; and the right-hand drawing corresponds to a second position 14, which is backward inclined. In this arrangement the seat with the movable fixing unit is affixed to the floor 12, for example in an aircraft.

In this arrangement a further exemplary embodiment is possible in which a seat is installed only with a movable fixing unit.

By means of the bearing arrangements 6 that are installed both on the parts of the seat structure 7 and on the floor affixation device 9, the connecting element 5 can be movably installed around said floor affixation device 9. Consequently, movement in the direction of the arrows is possible. Furthermore, the illustration shows that two different variants of the movable fixing unit 1 can be used. For example, the movable fixing unit attached to the front part of the seat comprises a locking mechanism with a hole 8 which when the position to be locked has been reached is opposite a corresponding hole 8a in the connecting element 5. In this way locking of the mechanism can be achieved by inserting a pin through the holes 8 and 8a. In this way the seat can, for example, be locked in the position 13 shown on the left and can be held in a stable manner in that position. This obviates the need to undo the seat from the floor in order to arrive at the desired changed position. In this arrangement the new position can provide increased passenger comfort.

In order to provide more stowage space or in order to implement increased seat spacing, the seat with the movable fixing unit 2 can be moved to position 14. To this effect the locking mechanism is undone, and, by means of external force, position 14 of the seat is achieved. This can be carried out without the hitherto required large installation effort, high cost and long planning time.

Figure 2:
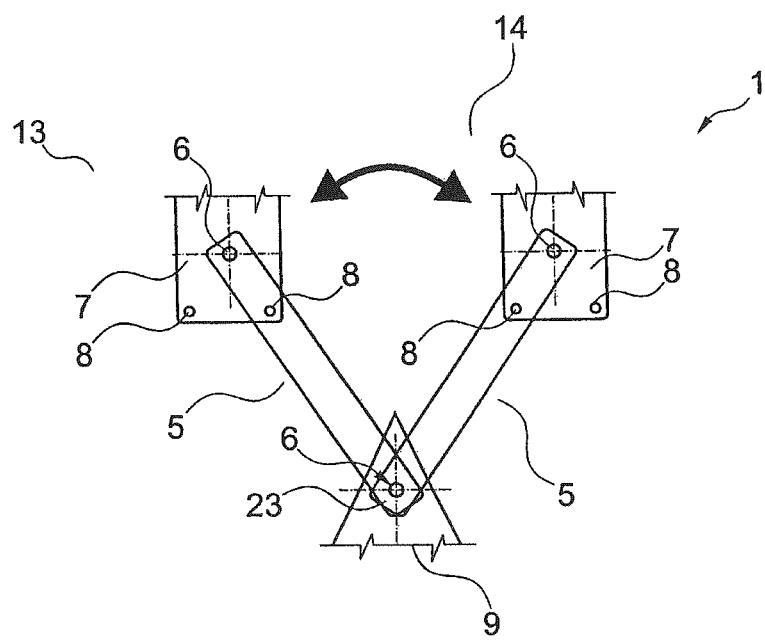
FIG. 2 shows a diagrammatic two-dimensional view of the movable fixing unit according to a further exemplary embodiment of the present invention.

FIG. 2 shows a movable fixing unit according to a further exemplary embodiment of the present invention. The illustration shows two positions 13 and 14 of the connecting element 5 and the part of the seat structure 7 affixed to it. Also shown is the floor affixation device 9 by means of which the forces are introduced from the seat into the primary structure of the aircraft. In order to be able to swing the connecting element on the bearing 6 it is first necessary to undo the locked state, which in the illustration shown as an example is implemented by means of the hole 8 in conjunction with a pin. In this arrangement the arrow shows the continuous movement of the connection element along a circular path to the new position 13 or 14.

In this arrangement the floor affixation device can, for example, be firmly installed on a seat rail in the aircraft.

Figure 3:
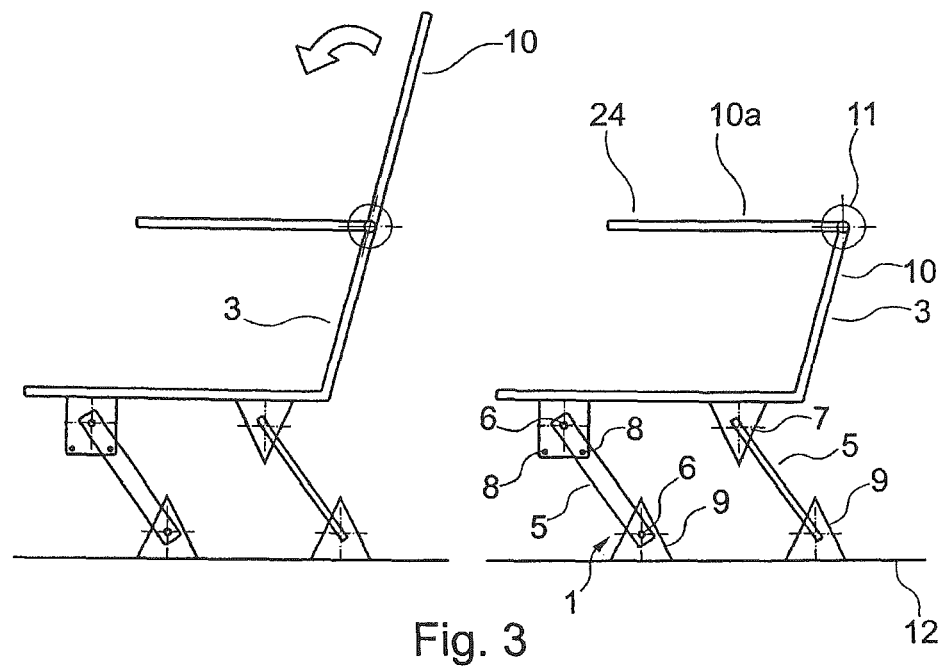
FIG. 3 shows a diagrammatic two-dimensional view of a movable fixing unit with an aircraft seat according to a further exemplary embodiment of the present invention.

FIG. 3 shows an exemplary embodiment of the present invention in which a normal seat 3 is altered to serve as a multifunctional storage device 22. In this arrangement the backrest 10, which is movably held by a joint, is folded over to a state 10a. Furthermore, the seat 3 comprises two movable fixing units 1 which by way of several bearings and joints 6 achieve positioning of the seat along the movement directions made possible by the bearing arrangement. A combination of this possible movement of the backrest and a movement through the fixing unit can be used to advantage to create stowage space in an aircraft. This is, for example, shown in FIG. 6.

Figure 4:
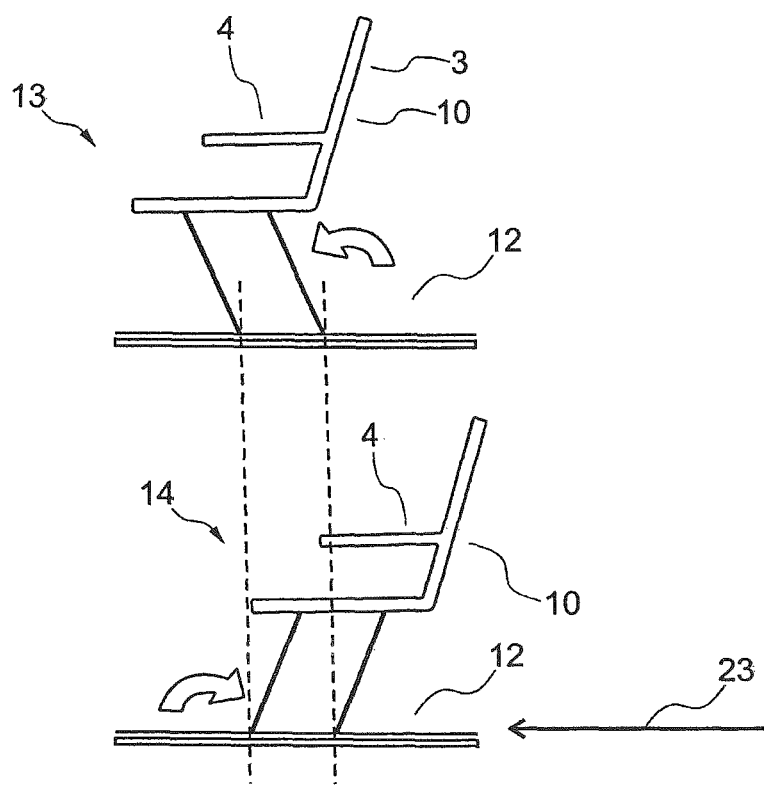
FIG. 4 shows a diagrammatic two-dimensional view of two seat positions of an aircraft seat according to a further exemplary embodiment of the present invention.

FIG. 4 shows two stable positions 13 and 14 of the seat 3, wherein the diagram clearly shows displacement of the backrest along the x-axis 23. In this way more stowage space and comfort for passengers seated in front or behind can be provided, as well as for the user of the seat itself. This effect is achieved by the movable fixing unit without the seat having to be deinstalled from the floor affixation device.

The mechanism shown clarifies just one possible functional principle. The concept can be implemented with different variants. This is, for example, shown in FIGS. 5 and 6, in which various seating situations with the fixing unit are optimised in relation to passenger comfort.

Figure 5:
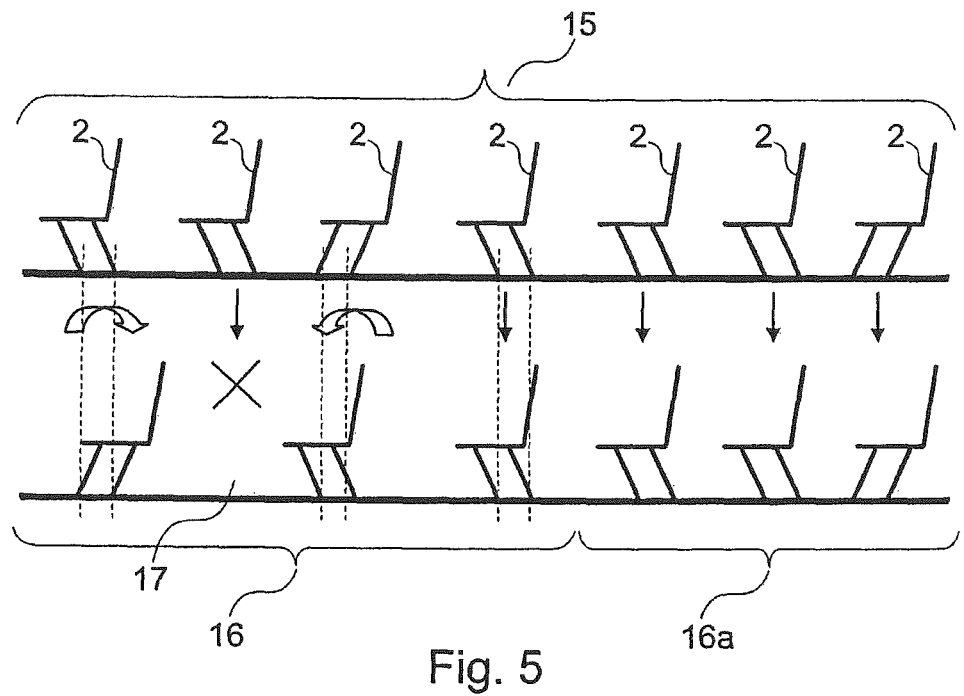
FIG. 5 shows a diagrammatic two-dimensional view of aircraft seating which can be changed according to a further exemplary embodiment of the present invention.

FIG. 5 shows a possible seating situation and its variation option with reference to an exemplary embodiment of the fixing unit in an aircraft. The illustration shows a first occupation variant with identical seat pitch 15, which variant comprises several seats with movable fixing units 2. Following possible reconfiguration by means of a movable fixing unit according to an exemplary embodiment of the present invention, this seating situation can be led to a state as shown in the partial image below. In this arrangement a seat 17 can have been removed. Furthermore, the position of the seat in front of and the seat behind the removed seat 17 can be changed by means of a movable fixing unit according to an exemplary embodiment of the invention. In this arrangement with such limited mechanical intervention a second occupation variant with some other seat pitch 16 can be implemented, wherein a third occupation variant 16a still has the same seat pitch as the occupation variant 15. It is thus possible to flexibly accommodate a second class in an existing seating situation.

It is thus possible, at the gate, to spontaneously react to unexpected passenger numbers in the various classes. From a region comprising the same seat pitch it becomes possible with only a few manipulative operations and without great effort, for example, to create business class with economy class situated behind it. In other words, different variants of seating are implemented that are related to the layout.

In this arrangement, adjustment starts in the first seat row because traditionally that is where business class passengers are seated, with economy class being located in the rear part of the cabin. Of course other combinations are possible, and adjustment is not limited to a defined number of seat rows. In this arrangement it is a matter of removing a seat.

The seats to be adjusted are basically arranged such that the first seat is folded from the front towards the back, and the second seat is removed. The third seat is folded from the back to the front, the fourth seat remains in position. In this way four rows of economy class become three rows of business class.

Figure 6:
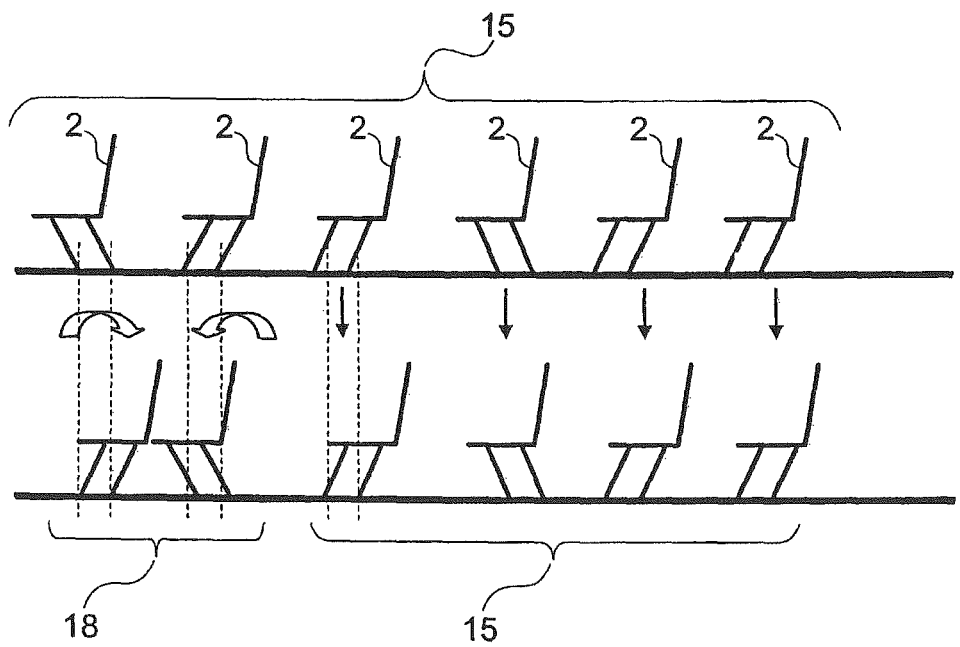
FIG. 6 shows a diagrammatic two-dimensional view of aircraft seating that can be changed according to a further exemplary embodiment of the present invention.

FIG. 6 shows a further variant of a change in the seating situation, wherein in this arrangement a displaced seat is used to create a new volume or a new surface which can, for example, be used as a storage device, shoe rack, table, or other stowage space. The diagram shows a first occupation variant 15 which provides equidistant spacing between the seats with movable fixing units 2. If according to an exemplary embodiment of the present invention the position of the first two seats (when viewed from the left) is brought together by means of the movable fixing unit and is subsequently locked, then a seat results that can no longer be used as a passenger seat (pax seat). However, some other use as a storage table or conversion to stowage space is possible.

Figure 7:
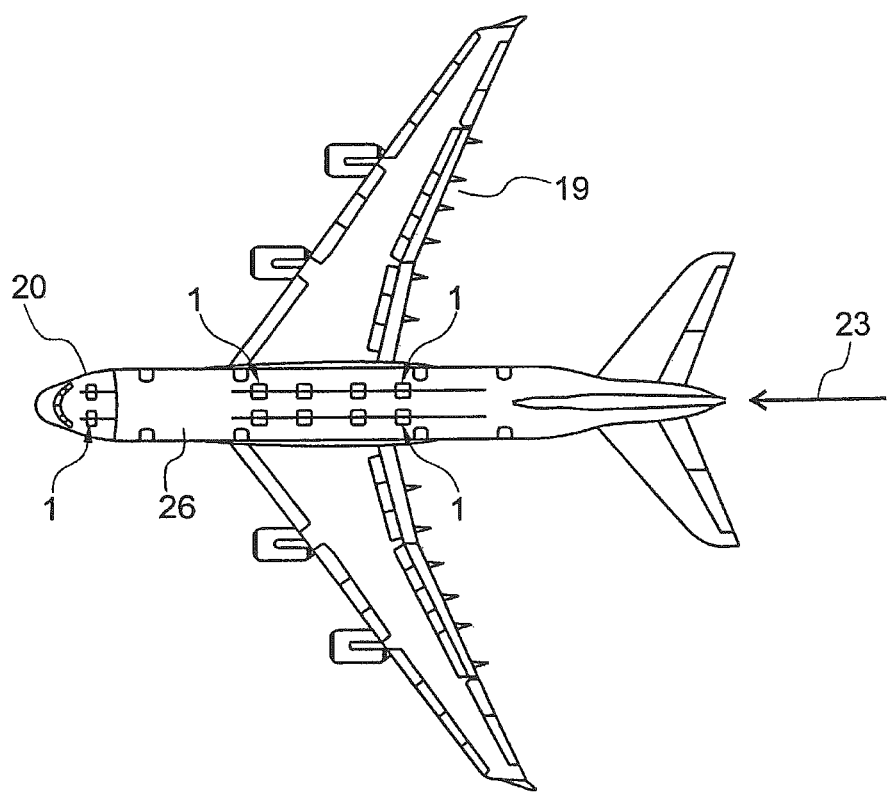
FIG. 7 shows an aircraft with movable fixing units according to a further exemplary embodiment of the present invention.

According to a further exemplary embodiment of the present invention, FIG. 7 shows an aircraft 19 with several movable fixing units 1. They can be situated either in the cabin region 24 or in the cockpit region 20. In this arrangement the concept of the movable fixing unit is used so that the seat pitch can be variably implemented at the gate. In this arrangement the seats concerned comprise a seat frame that makes it possible to position the seat cushion, including the backrest, at several positions in longitudinal direction 23 of the aircraft, without the need to undo the seat per se from the seat frame. It is thus possible to react to a variable number of passengers in various classes, and it is further possible to provide business class passengers with clearly improved seating comfort when compared to that hitherto provided. In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Movable fixing unit
2 Seat with movable fixing unit
3 Seat
4 Armrest
5 Connecting element
6 Bearing arrangement
7 Part of the seat structure
8 Hole of the locking mechanism
8a Hole in the connecting element
9 Floor affixation device
10 Backrest (foldable)
10a Folded-over backrest
11 Joint
12 Floor of the aircraft
13 Seat unit in position A
14 Seat unit in position B
15 Occupation variant 1 with equidistant seat pitch
16 Occupation variant 2 with seat pitch X
16a Occupation variant 3 with seat pitch Y
17 Removed seat
18 Seats usable as a storage device, table
19 Aircraft
20 Cockpit
21 Axis
22 Multifunctional storage device
23 X-direction
24 Cabin region

The invention claimed is:

1. A seat unit for an aircraft, the seat unit comprising:
an aircraft seat with a seat frame; and
a first and a second movable fixing unit arranged parallel to each other and pivotably attached to the seat frame,
wherein each of the first and second fixing units comprises:
a connecting element;
wherein the connecting element comprises a first bearing arrangement for allowing the connecting element to be movably attached to the seat frame;
wherein the connecting element comprises a second bearing arrangement for allowing the connecting element to be movably attached to a floor affixation device; and
wherein the first and second bearing arrangements are configured to allow movement of the seat frame relative to the floor affixation device from a first seat position to a second seat position;
wherein the first and the second seat positions are stable seat positions from which the seat frame moves only upon application of an external force, the seat frame being positioned at the same relative horizontal orientation with a floor in the first and second seat positions;
wherein the connecting elements are adapted to move on a respective bearing arrangement;
wherein at least one of the fixing units comprises a locking mechanism in a region of one of the bearing arrangements;
wherein the locking mechanism comprises an unlocked and a locked state;
wherein, in the unlocked state, the connecting element is movable on the respective bearing arrangement;
wherein, in the locked state, the locking mechanism is configured to prevent movement of the connecting element on the respective bearing arrangement; and
wherein the locking mechanism comprises a bore hole in conjunction with a locking pin.

2. The seat unit of claim 1, wherein the seat frame is configured to move without undoing the floor affixation device from the floor.

3. The seat unit of claim 1, wherein at least one of the bearing arrangements is configured so as to be rotationally held.

4. The seat unit of claim 1, wherein at least one of the seat frame or the floor affixation device in conjunction with the connecting element forms the locking mechanism.

5. The seat unit of claim 1, wherein the locking mechanism supports locking in first and second different positions.

6. The seat unit of claim 1, wherein, by moving the bearing arrangement, the fixing unit positions the seat frame along a predetermined axis.

7. The seat unit of claim 1, configured for infinitely adjustable positioning of the seat frame.

8. The seat unit of claim 1, wherein the fixing unit further comprises:
the floor affixation device;
a fixation unit;
wherein the fixation unit forms part of the seat frame of the aircraft; and
wherein the connecting element is configured to be attached to the seat frame by means of the fixation unit.

9. The seat unit of claim 1, wherein the aircraft seat comprises a foldable backrest;
wherein, by folding the backrest, the aircraft seat is configured to transform into a table or a storage unit for a passenger seated behind the aircraft seat.

10. An aircraft comprising a seat unit, the seat unit comprising:
an aircraft seat with a seat frame; and
a first and a second movable fixing unit, arranged parallel to each other and pivotably attached to the seat frame,
wherein each of the first and second fixing units comprises:
a connecting element;
wherein the connecting element comprises a first bearing arrangement for allowing the connecting element to be movably attached to the seat frame;
wherein the connecting element comprises a second bearing arrangement for allowing the connecting element to be movably attached to a floor affixation device; and wherein the first and second bearing arrangements are configured to allow movement of the seat frame relative to the floor affixation device from a first seat position to a second seat position;

wherein the first and the second seat positions are stable seat positions from which the seat frame moves only upon application of an external force, the seat frame being positioned at the same relative horizontal orientation with a floor in the first and second seat positions;

wherein the connecting elements are adapted to move on a respective bearing arrangement;

wherein at least one of the fixing units comprises a locking mechanism in a region of one of the bearing arrangements;

wherein the locking mechanism comprises an unlocked and a locked state;

wherein, in the unlocked state, the connecting element is movable on the respective bearing arrangement;

the locked state, the locking mechanism prevents movement of the connecting element on the respective bearing arrangement; and wherein the locking mechanism comprises a bore hole in conjunction with a locking pin.

11. A method for changing a spacing of seating in an aircraft having a seat having a first upright seating position, a second upright seating position, and a floor, the method comprising:

transitioning the seat between the first and second upright seating positions, wherein the step of transitioning the seat repositions the entire seat along a predetermined direction without undoing the seat from an affixation device on the floor while maintaining the same relative horizontal orientation with a floor;

unlocking a locking mechanism of the movable fixing unit; and locking a locking mechanism of the movable fixing unit, wherein the locking mechanism comprises a bore hole in conjunction with a locking pin.

12. The method of claim 11, wherein the step of moving the seat changes a spacing of the seat from surrounding seats.

13. The aircraft of claim 10, wherein by moving the seat unit from a first seat position to a second seat position, a change of seat pitch is caused.

14. The aircraft of claim 1, wherein the first and second seat positions comprise a first upright seating position and a second upright seating position, respectively.

* * * * *